United States Patent [19]

Yamauchi

[11] Patent Number: 4,688,136
[45] Date of Patent: Aug. 18, 1987

[54] GAS INSULATED SWITCHGEAR

[75] Inventor: Takao Yamauchi, Amagasaki, Japan

[73] Assignee: Mitsubishi Denki Kabushiki Kaisha, Japan

[21] Appl. No.: 847,462

[22] Filed: Apr. 3, 1986

[30] Foreign Application Priority Data

Apr. 4, 1985 [JP] Japan .................................. 60-73114

[51] Int. Cl.⁴ .............................................. H02H 1/00
[52] U.S. Cl. ................................ 361/120; 200/148 R; 361/14; 361/115
[58] Field of Search ...................... 361/5, 6, 7, 14, 93, 361/115, 117, 120; 200/148 R

[56] References Cited

U.S. PATENT DOCUMENTS

| | | | |
|---|---|---|---|
| 3,881,766 | 5/1975 | Pratsch | 361/115 |
| 4,275,431 | 6/1981 | Swoish et al. | 361/14 X |
| 4,485,422 | 11/1984 | Takanashi | 361/7 X |
| 4,492,831 | 1/1985 | Oakes | 361/344 X |
| 4,493,009 | 1/1985 | Lorenz et al. | 361/333 X |
| 4,528,437 | 7/1985 | Burnett et al. | 361/91 X |
| 4,536,814 | 8/1985 | Theisen et al. | 361/7 |
| 4,570,202 | 2/1986 | Nishida et al. | 361/131 X |

Primary Examiner—Roy N. Envall, Jr.
Assistant Examiner—Jeffrey A. Gaffin
Attorney, Agent, or Firm—Leydig, Voit & Mayer

[57] ABSTRACT

A protective device in a gas insulated switchgear having a housing providing a gas chamber containing a gaseous medium and insulating a bus bar circuit inside the gas chamber. The protective device includes a fault detector outside the gas chamber and connected to the bus bar circuit to detect a fault and an arc detector inside the gas chamber to detect an arc generated upon the occurrence of a fault. A circuit interrupter connected in the bus bar circuit is operated responsive to the concurrent operation of the detectors.

4 Claims, 4 Drawing Figures

GAS INSULATED SWITCHGEAR

BACKGROUND OF THE INVENTION

This invention relates to a gas insulated switchgear and in particular to a protective system therefor.

FIG. 4 illustrates a conventional gas insulated switchgear. In the figure, the broken lines designate a housing having a gas medium for insulating a bus bar 2 within the gas chamber. When a fault condition occurs in a gas insulated bus bar 2, current transformers 4, 6 and 8 detect abnormal currents in the same phase. These abnormal currents are supplied to a control circuit 10, which causes the interrupters 12, 14 and 16 to be tripped to protect the bus bar 2.

On the other hand, when a fault condition occurs outside of the region to be protected for example, in a transmission line 24 in the air outside of bushings 18 where the bus bar 2 is connected to the transmission line 24, not all of the current transformers 4, 6 and 8 detect abnormal current in the same phase. Therefore, the control circuit 10 determines that the fault condition occurs outside of the region to be protected and does not protect the bus bar 2.

However, there are the following problems in the conventional protecting system. Since there is some error in the current transformer and the voltage transformer in a fault is within the region to be protected or the fault is outside of the region to be protected when the fault current is low and within the range of the error. Therefore, the conventional system is disadvantageous in that it is activated even when the fault is outside of the region to be protected or that it fails to achieve interrupting operation even when the fault occurs within the region to be protected.

SUMMARY OF THE INVENTION

This invention has as its object the provision of a protective device in which the above problem is eliminated and which achieves a high reliability.

According to the present invention, when a fault occurs, irrespective of whether it is inside or outside of the region to be protected, a fault detecting means detects the fault. When the fault is within the region to be protected, an arc detecting means detects the arc. A control means activates the interrupter on the basis of the outputs from both detectors.

On the other hand, if a fault occurs outside of the region to be protected, the arc detecting means does not provide a detecting output, and the interrupter is not actuated.

BRIEF DESCRIPTION OF THE DRAWINGS

The present invention will become more readily apparent from the following detailed description of the preferred embodiment of the invention taken in conjunction with the accompanying drawings, in which.

DETAILED DESCRIPTION OF THE PREFERRED EMBODIMENT

Figure 1:
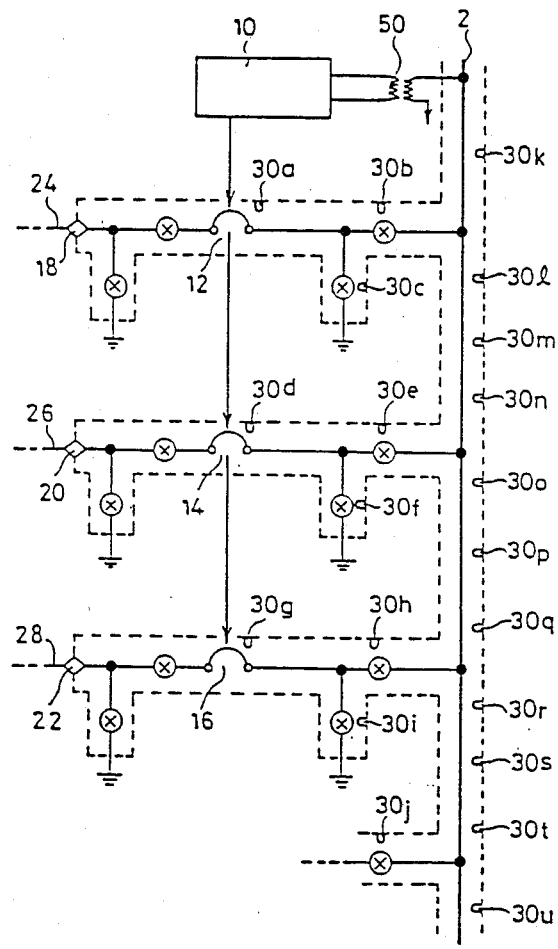
FIG. 1 is an electrical diagram showing one embodiment of the present invention.
Figure 2:
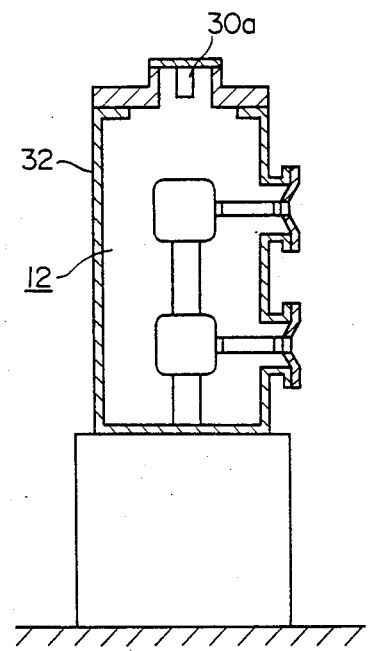
FIG. 2 is a cross sectional view showing the location in which a photoelectric detector element is installed.
Figure 3:
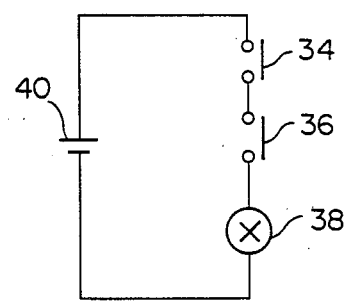
FIG. 3 is a view showing an electrical diagram of the control circuit.

FIG. 1 illustrates one embodiment of the present invention. In this embodiment, a voltage transformer 50 is used as a fault detecting means. Within the housing 32 in the region to be protected, photoelectric detector elements 30a–30u which are arc detecting means are provided. FIG. 2 illustrates the manner in which the photoelectric detector element 30a is mounted inside the housing 32 of the interrupter 12. When a fault occurs and an electric arc is generated inside of the housing 32, the photoelectric detector element 30a provides an output. This output is supplied to a control circuit 10 shown in FIG. 1. A simplified circuit diagram of the control circuit 10 is shown in FIG. 3. When a voltage drop is detected at the voltage transformer, a contact 34 closes. When a detection output is provided from any one of the photoelectric detector elements 30a–30u, the contact 16 is also closed. Therefore, the coil 38 is energized and the interrupters 12, 14 and 16 are tripped open.

When a fault occurs outside of the region to be protected such as on the transmission line 24, no output is provided from either of the photoelectric detector elements 30a–30u, so that the contact 36 is held open. Therefore, in this case, an operation in which all of the circuit interrupters interrupt is not effected.

The contact 36 is closed even when a very small arc which does not result in a fault is generated. However, in this case, since an abnormal current is not detected at the voltage transformer 50, the contact 34 is kept open. That is, no unnecessary interrupting operation is effected.

While a photoelectric detector element is used as an arc detecting means at the locations represented by the reference numerals 30a–30u in the above embodiment, an element which detects physical changes such as vibration or pressure change generated by the arc may also be used.

Also, as another embodiment, an element for detecting a zero-phase current may be employed as the fault detecting means, hereinabove described as a voltage transformer 50 in the embodiment illustrated in FIG. 1.

According to the present invention, an occurrence of a fault is detected by a fault detecting means and the determination of whether the fault is outside of the region to be protected or inside of the region to be protected is made by an arc detecting means. Therefore, the following advantages are provided.

Firstly, an accurate determination of whether the fault is outside of the region to be protected or inside of the region to be protected can be made without errors even when the fault current is small as in the case of an ineffective grounding system.

Figure 4:
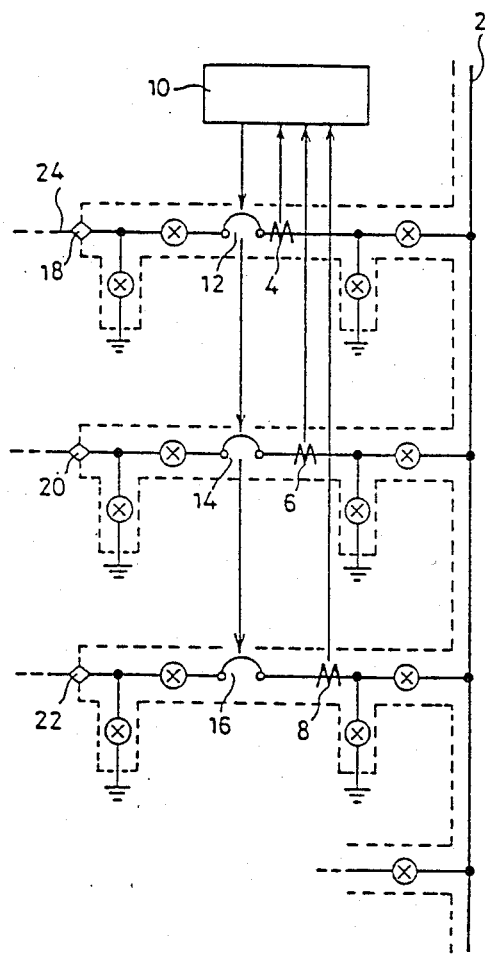
FIG. 4 is a view showing a conventional gas insulated switchgear.

Secondly, since an arc detecting means is provided between the interrupter and the location in the prior art protective device of the current transformer (FIG. 4), protection can be provided with respect to this region which has heretofore been a blind spot.

Thirdly, as a result of eliminating the above blind spot, the need to provide the interrupter and current transformer in a proximate relationship is eliminated. That is, the degree of freedom in deciding the mounting position of the fault detecting means is increased, enabling the gas insulated switchgear to be reduced in size and made at lower cost.

What is claimed is:

1. In a gas insulated switchgear having a housing providing a gas chamber having a gaseous medium insulating a bus bar circuit disposed inside the gas chamber and connected to supply current to a transmission line circuit outside the gas chamber, a circuit interrupter connected in the bus bar circuit disposed inside the gas chamber for interrupting current flowing therethrough, and a protective device controlling the operation of said circuit interrupter upon the occurrence of a fault in the circuit inside or outside the gas chamber, said protective device comprising:

means disposed inside the gas chamber for detecting an arc generated inside the gas chamber due to a fault in the bus bar circuit, means disposed outside the gas chamber and connected to the bus bar circuit for detecting a fault in the circuits inside or outside the gas chamber, and control means controlling the operation of said circuit interrupter to interrupt the flow of current through the bus bar circuit responsive only to concurrent arc and fault detection by said means.

2. A protective device in a gas insulated switchgear as claimed in claim 1 wherein said arc detecting means comprises a plurality of photoelectric detector elements for detecting the light resulting from an arc generated inside the gas chamber due to a fault in the bus bar circuit.

3. A protective device in a gas insulated switchgear as claimed in claim 1 wherein said arc detecting means comprises an element for detecting physical change inside the gas chamber resulting from an arc generated inside the gas chamber due to a fault in the bus bar circuit.

4. A protective device in a gas insulated switchgear as claimed in claim 1 wherein said fault detecting means comprises a voltage transformer connected to detect a predetermined drop in voltage of the bus bar circuit.

* * * * *